(12) United States Patent
Lee (10) Patent No.: US 8,687,130 B2
(45) Date of Patent: Apr. 1, 2014

(54) REMOTE CONTROLLER, AND SYSTEM AND METHOD FOR REMOTELY CONTROLLING DIGITAL TELEVISION

(75) Inventor: Jung Woo Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 702 days.

(21) Appl. No.: 12/524,986

(22) PCT Filed: Jul. 23, 2008

(86) PCT No.: PCT/KR2008/004305
§ 371 (c)(1),
(2), (4) Date: Dec. 28, 2009

(87) PCT Pub. No.: WO2009/014375
PCT Pub. Date: Jan. 29, 2009

(65) Prior Publication Data
US 2012/0268660 A1    Oct. 25, 2012

(30) Foreign Application Priority Data

Jul. 23, 2007  (KR) ........................ 10-2007-0073623

(51) Int. Cl.
*H04N 5/44* (2011.01)
*H04N 7/173* (2011.01)
*H04B 1/38* (2006.01)

(52) U.S. Cl.
USPC ............ 348/734; 725/133; 725/100; 455/557

(58) Field of Classification Search
None
See application file for complete search history.

(56) References Cited

U.S. PATENT DOCUMENTS

| 2003/0202592 | A1 | 10/2003 | Sohn et al. |
| 2004/0227859 | A1* | 11/2004 | Liang ............................ 348/734 |
| 2005/0114901 | A1* | 5/2005 | Yui et al. ....................... 725/100 |
| 2007/0042806 | A1* | 2/2007 | Stepanian ..................... 455/557 |
| 2008/0117339 | A1* | 5/2008 | Kirsche ......................... 348/734 |

FOREIGN PATENT DOCUMENTS

| CN | 2423688 Y | 3/2001 |
| CN | 2664317 Y | 12/2004 |
| CN | 2722533 Y | 8/2005 |
| EP | 1 083 744 A2 | 3/2001 |
| EP | 1 515 550 A1 | 3/2005 |
| JP | 2001-86575 A | 3/2001 |
| JP | 2006-86589 A | 3/2006 |
| KR | 10-2007-0001534 A | 1/2007 |

* cited by examiner

*Primary Examiner* — Jefferey Harold
*Assistant Examiner* — Sean Haiem
(74) *Attorney, Agent, or Firm* — Birch, Stewart, Kolasch & Birch, LLP (57) ABSTRACT

A remote controller (100) and a system and method for remotely controlling a digital TV are disclosed. A memory card (110) is mounted in the remote controller (100), and the remote controller (100) receives video or audio data inputted from the memory card (110) and transmits the received data to a TV body (300). The remote controller (100) receives the video or audio data from the memory card (110) modulates the received data into a wireless signal and transmits the modulated wireless signal, and the TV body (300) receives the wireless signal transmitted from the remote controller (100), demodulates the received wireless signal into the video or audio data and reproduces the demodulated video or audio data. Therefore, the user can remotely control the TV body (300) without personally inserting the memory card (110) into the TV body (300). As a result, the user does not need to move to a place where the TV body (300) is located resulting in convenience in use.

12 Claims, 6 Drawing Sheets

REMOTE CONTROLLER, AND SYSTEM AND METHOD FOR REMOTELY CONTROLLING DIGITAL TELEVISION

TECHNICAL FIELD

The present invention relates to a digital television (TV), and more particularly, to a system and method for remotely controlling a digital TV, which can remotely transmit video or audio data using a remote controller.

BACKGROUND ART

Recently, a separate infrared remote controller has been provided in a digital TV to provide functions to enable the user to remotely perform a channel change, a volume adjustment and other operations conveniently without moving to a place where a TV body is located.

Also, recently, more various functions have been provided for the digital TV. In one such function, a memory card can be inserted into the TV body, and the TV body can read video data stored in the memory card and output the read video data to a screen.

However, such a conventional digital TV is disadvantageous in that the user has to personally insert the memory card into the TV body. That is, the user has the inconvenience of having to move to the place of the TV body to insert the memory card into the TV body even in the middle of remotely controlling the TV body using the remote controller.

In addition, in the case where the memory card is mounted in the remote controller, a general infrared system cannot smoothly transmit video and audio data of relatively large capacity from the remote controller to the TV body.

DISCLOSURE OF INVENTION

Technical Problem

An object of the present invention devised to solve the problem lies on a remote controller which has means for insertion of an external storage medium into the remote controller, and receives video or audio data inputted from the external storage medium and transmits the received data to a TV body, and a system and method for remotely controlling a digital TV.

Technical Solution

The object of the present invention can be achieved by providing a system for remotely controlling a digital television (TV) using a remote controller, the system comprising: the remote controller for receiving video or audio data inputted from the external storage medium, modulating the received data into a wireless signal and transmitting the modulated wireless signal; and a TV body for receiving the wireless signal transmitted from the remote controller, demodulating the received wireless signal into the video or audio data and reproducing the demodulated video or audio data.

The wireless signal may be based on any one of ZigBee, radio frequency (RF), infrared ray and Bluetooth standard technologies.

The external storage medium may be any one of a secure digital (SD) card, a MultiMedia Card (MMC), a compact flash (CF) card and a universal serial bus (USB) memory card.

The system may further comprise at least one of an audio device and a headset, each of the audio device and headset receiving the wireless signal transmitted from the remote controller and demodulating the received wireless signal to selectively reproduce only the audio data.

The TV body may reproduce only the video data when the audio device or headset reproduces the audio data.

Each of the audio device and headset may comprise: a wireless signal receiver for receiving the wireless signal transmitted from the remote controller; a data de-modulator for demodulating the wireless signal received by the wireless signal receiver into the audio data; an error detector for detecting an error of the data demodulated by the data demodulator; an audio decoder for decoding audio data from the error detector; an audio processor for processing the decoded audio data for reproduction thereof; and a speaker for outputting the audio data processed by the audio processor.

The remote controller may have an interface formed at an end portion thereof, the external storage medium being detachably mounted in the interface to input the video or audio data to the remote controller via the interface.

The video data may be still image data or moving image data.

The audio data may be MP3 file data.

In another aspect of the present invention, provided herein is a remote controller comprising: a data input unit for receiving video or audio data inputted from an external storage medium; a data modulator for modulating the video or audio data received by the data input unit into a transmittable wireless signal; a frequency converter for down-converting a local oscillation frequency of the wireless signal modulated by the data modulator; a noise filter for filtering noise of the wireless signal frequency-down-converted by the frequency converter; and a wireless signal transmitter for transmitting the wireless signal noise-filtered by the noise filter.

The frequency converter may down-convert the location oscillation frequency into 12 MHz or 24 MHz.

The remote controller may further comprise an indicator for indicating that the wireless signal is transmitted.

The indicator may be a light emitting diode (LED).

In another aspect of the present invention, provided herein is a TV receiver comprising: a wireless signal receiver for receiving a wireless signal transmitted from a remote controller, the remote controller receiving video or audio data inputted from an external storage medium; a data demodulator for demodulating the wireless signal received by the wireless signal receiver into the video or audio data; an error detector for detecting an error of the data demodulated by the data demodulator; a video decoder for decoding video data from the error detector; an audio decoder for decoding audio data from the error detector; a video processor for processing the decoded video data for reproduction thereof; an audio processor for processing the decoded audio data for reproduction thereof; a display module for displaying an image from the video processor on the screen; and a speaker for outputting a sound from the audio processor.

The wireless signal may be based on any one of ZigBee, RF, infrared ray and Bluetooth standard technologies.

The image may be a still image or moving image.

The sound may be an MP3 file sound.

In a further aspect of the present invention, provided herein is a method for remotely controlling a digital TV using a remote controller, the method comprising: a) the remote controller reading video or audio data from an external storage medium, modulating the read data into a wireless signal and transmitting the modulated wireless signal; and b) a TV body receiving the wireless signal transmitted from the remote controller, demodulating the received wireless signal into the video or audio data and reproducing the demodulated video or audio data.

The wireless signal may be based on any one of ZigBee, RF, infrared ray and Bluetooth standard technologies.

The step a) may comprise: a-1) reading the video or audio data from the external storage medium; a-2) modulating the video or audio data read at the step a-1) into a transmittable wireless signal; a-3) down-converting a local oscillation frequency of the wireless signal modulated at the step a-2); a-4) filtering noise of the wireless signal frequency-down-converted at the step a-3); and a-5) transmitting the wireless signal noise-filtered at the step a-4).

The step a-3) may comprise down-converting the location oscillation frequency into 12 MHz or 24 MHz.

The step b) may comprise: b-1) receiving the wireless signal transmitted from the remote controller; b-2) demodulating the wireless signal received at the step b-1) into the video or audio data; b-3) detecting an error of the data demodulated at the step b-2); b-4) decoding video or audio data outputted at the step b-3); b-5) processing the video data decoded at the step b-4) for reproduction thereof; b-6) processing the audio data decoded at the step b-4) for reproduction thereof; b-7) displaying the video data processed at the step b-5) on a screen; and b-8) outputting the audio data processed at the step b-6) through a speaker.

The method may further comprise c) at least one of an audio device and a headset receiving the wireless signal transmitted from the remote controller and demodulating the received wireless signal to selectively reproduce only the audio data.

The TV body may reproduce only the video data when the audio device or headset reproduces the audio data.

The step c) may comprise: c-1) receiving the wireless signal transmitted from the remote controller; c-2) demodulating the wireless signal received at the step c-1) into the audio data; c-3) detecting an error of the data demodulated at the step c-2); c-4) decoding audio data outputted at the step c-3); c-5) processing the audio data decoded at the step c-4) for reproduction thereof; and c-6) outputting the audio data processed at the step c-5) through a speaker.

Advantageous Effects

According to the present invention, an external storage medium is mounted in a remote controller, and a remote controller receives video or audio data inputted from the external storage medium and transmits the received data to a TV body. Therefore, the user can remotely control the TV body without personally inserting the external storage medium, such as a memory card, into the TV body. As a result, the user does not need to move to a place where the TV body is located, resulting in convenience in use. Further, ZigBee standard communication is used, thereby enabling video or audio data of relatively large capacity to be smoothly transmitted from the remote controller to the TV body.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. Besides, although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

Figure 1:
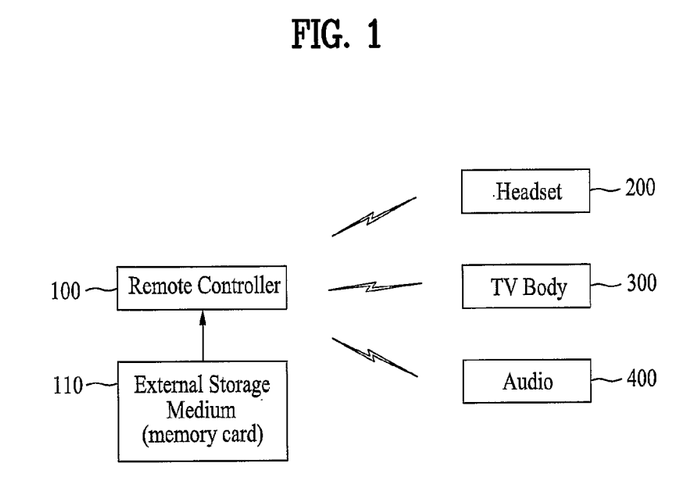
FIG. 1 is a block diagram showing the configuration of a system for remotely controlling a digital TV using a remote controller, according to the present invention.

FIG. 1 is a block diagram showing the configuration of a system for remotely controlling a digital TV using a remote controller, according to the present invention.

As shown, the digital TV remote control system according to the present invention comprises a remote controller 100, an external storage medium 110, a headset 200, a TV body 300, and an audio device 400.

The remote controller 100 receives video or audio data inputted from the external storage medium 110, modulates the received data into a wireless signal and transmits the modulated wireless signal. Here, the external storage medium 110 may be a memory card such as a secure digital (SD) card, MultiMedia Card (MMC) or compact flash (CF) card, or a universal serial bus (USB) memory card.

The TV body 300 receives the wireless signal transmitted from the remote controller 100, demodulates the received wireless signal into the video or audio data and reproduces the demodulated video or audio data.

The wireless signal transmitted and received between the remote controller 100 and the TV body 300 is preferably based on any one of ZigBee, radio frequency (RF), infrared ray and Bluetooth standard technologies.

The ZigBee standard technology is a standard technology adopted for implementation of a wireless sensor network, or a basic network for construction of a ubiquitous sensor network (USN), in IEEE 1451 (in charge of sensor network standardization).

The existing wireless personal area network (WPAN) technologies (Bluetooth, IrDA, etc.) are high in cost and require a large amount of power consumption, resulting in poor activation thereof on the market. In contrast, the ZigBee technology enables the construction of a low-functionality sensor network of a simple function. The biggest feature of the ZigBee technology is a low-power operation where the average power consumption is on the order of 50 mW. Considering that the average power consumption of an ultra wideband (UWB) network is about 200 mW and the average power consumption of a wireless local area network (LAN) is about 1 W, the ZigBee technology has a very low power consumption characteristic.

The headset 200 functions to receive the wireless signal transmitted from the remote controller 100 and demodulate the received wireless signal to selectively reproduce only the audio data. When the headset 200 reproduces the audio data, the TV body 300 reproduces only the video data.

The audio device 400 functions in a similar manner to the headset 200. That is, the audio device 400 receives the wireless signal transmitted from the remote controller 100 and demodulates the received wireless signal to selectively reproduce only the audio data.

Notably, the audio device 400 outputs the audio data through a speaker of high power, whereas the headset 200 outputs the audio data through a small speaker such as a headphone or earphone.

Figure 2:
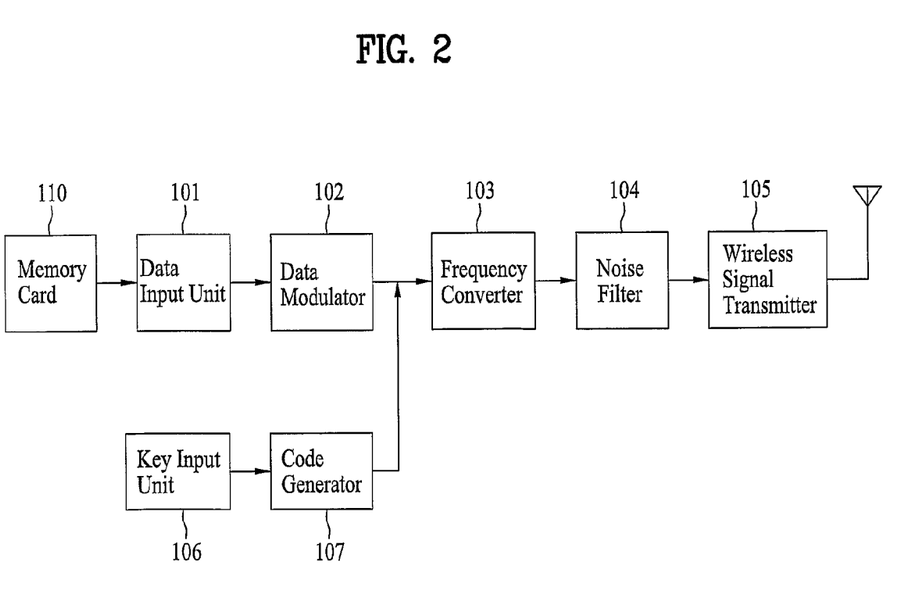
FIG. 2 is a block diagram of the remote controller according to the present invention.

FIG. 2 is a block diagram of the remote controller of the digital TV remote control system according to the present invention.

As shown, the remote controller 100 of the present invention includes a data input unit 101, a data modulator 102, a frequency converter 103, a noise filter 104, a wireless signal transmitter 105, a key input unit 106, and a code generator 107.

The data input unit 101 receives the video or audio data inputted from the external storage medium 110, and the data modulator 102 modulates the video or audio data received by the data input unit 101 into a transmittable wireless signal.

The frequency converter 103 down-converts a local oscillation frequency of the wireless signal modulated by the data modulator 102 into 12 MHz or 24 MHz, and the noise filter 104 filters noise of the wireless signal frequency-down-converted by the frequency converter 103.

The wireless signal transmitter 105 transmits the wireless signal noise-filtered by the noise filter 104.

The key input unit 106 receives a command inputted from the user, and the code generator 107 generates a control code corresponding to the user command received by the key input unit 106 and transfers the generated control code to the frequency converter 103.

With this configuration, the remote controller 100 modulates the video or audio data inputted from the external storage medium 110 into the wireless signal and transmits the modulated wireless signal.

Figure 3:
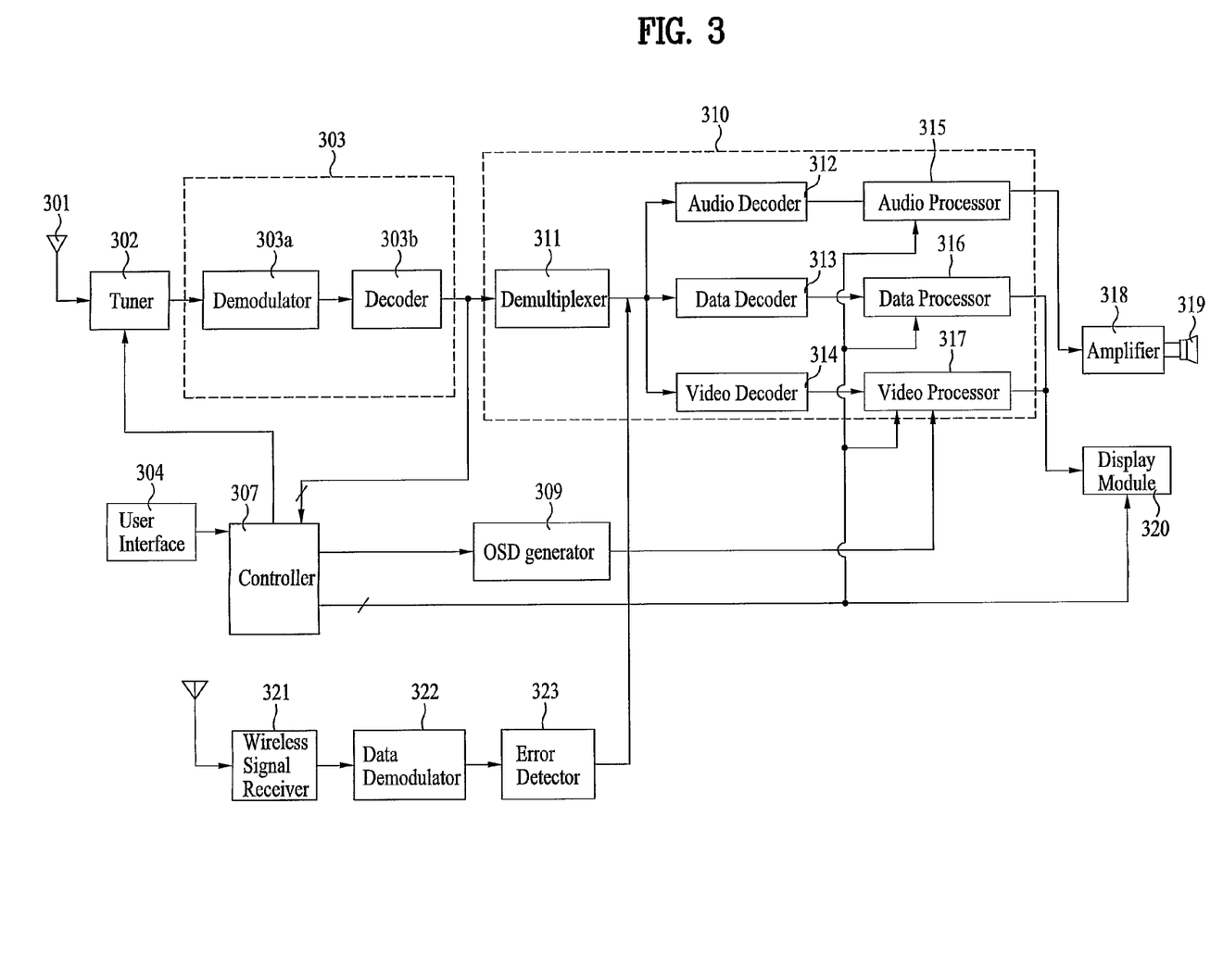
FIG. 3 is a block diagram of a TV body according to the present invention.

FIG. 3 is a block diagram of the TV body of the digital TV remote control system according to the present invention.

As shown, the TV body 300 of the present invention includes a controller 307 for controlling the entire operation of the TV body 300, a user interface 304, an on-screen display (OSD) generator 309 for generating OSD data under the control of the controller 307, an antenna 301 for receiving broadcast signals, a tuner 302 for selecting a broadcast channel to be watched by the user under the control of the controller 307, a digital broadcast signal processor 303 for processing a digital broadcast signal (or transport stream) from the tuner 302, a broadcast signal output unit 310 for separating an output signal from the digital broadcast signal processor 303 into a video stream, a data stream and an audio stream including an audio signal for the video stream and an audio signal for the data stream, and converting the video stream, data stream and audio stream into a displayable image, displayable data and an audible sound, respectively, an amplifier 318 for amplifying the audible sound from the broadcast signal output unit 310 by a predetermined amplification degree, a speaker 319 for outputting the audible sound amplified by the amplifier 318, and a display module 320 for displaying the image and data from the broadcast signal output unit 310 on a screen.

The digital broadcast signal processor 303 includes a demodulator 303a and a decoder 303b, and the broadcast signal output unit 310 includes a demultiplexer 311, an audio decoder 312, a data decoder 313, a video decoder 314, an audio processor 315, a data processor 316, and a video processor 317.

The TV body 300 of the present invention further includes a wireless signal receiver 321 for receiving the wireless signal transmitted from the remote controller 100, a data demodulator 322 for demodulating the wireless signal received by the wireless signal receiver 321 into the video or audio data, and an error detector 323 for detecting an error of the data demodulated by the data demodulator 322. The video decoder 314 decodes video data from the error detector 323, and the audio decoder 312 decodes audio data from the error detector 323. The video processor 317 processes the decoded video data for reproduction thereof, and the audio processor 315 processes the decoded audio data for reproduction thereof. The display module 320 displays an image from the video processor 317 on the screen, and the speaker 319 outputs a sound from the audio processor 315.

Hereinafter, the above-mentioned constituent elements of the present invention will be described in detail. Although the television broadcast receiver has been described in the present embodiment as an example, it will be understood that the present invention is also applicable to another video receiver such as a set-top box.

The controller 307 controls the entire operation of the television broadcast receiver. Particularly, the controller 307 drives the tuner 302 to tune a broadcast signal of a data broadcast channel that the user selects to watch a data broadcast, and provides control signals to determine display attributes of the tuned broadcast signal according to the user s selection. The controller 307 may be a general central processing unit (CPU) or microcomputer having computation, comparison, determination and control functions.

Also, the controller 307 controls the OSD generator 309 to generate OSD data corresponding to a function selected by the user. For example, when the user pushes a menu key to determine the display attributes through the user interface 304, the controller 307 controls the OSD generator 309 to generate OSD data corresponding to respective menu items of the display attributes on the screen.

Then, the generated OSD data is inputted to the video processor 317 of the broadcast signal output unit 310, which then mixes the video data with the inputted OSD data and provides the resulting data to the display module 320.

The respective display attribute menu items are displayed on the screen so that they can be selected through the user interface 304 by the user.

On the other hand, the user may select the respective display attributes directly through predetermined function keys, among keys of the user interface 304.

The user interface 304 may be a keypad or remote controller, and provides various commands or information inputted from the user to the controller 307.

The OSD generator 309 generates OSD data under the control of the controller 307, as stated above, and provides the generated OSD data to the video processor 317 of the broadcast signal output unit 310.

On the other hand, the tuner 302 tunes a broadcast signal of one data broadcast channel, among broadcast signals received in the form of transport streams, under the control of the controller 307 and provides the transport stream of the tuned broadcast signal to the digital broadcast signal processor 303.

The television broadcast receiver may receive signals from various sources, such as an analog broadcast signal and an external input signal.

The digital broadcast signal processor 303 includes the demodulator 303a and the decoder 303b, as stated above. The demodulator 303a demodulates the transport stream provided from the tuner 302, and the decoder 303b decodes the demodulated transport stream and outputs the decoded transport stream to the broadcast signal output unit 310.

In the broadcast signal output unit 310, the demultiplexer 311 separates the transport stream outputted from the digital broadcast signal processor 303 into an audio stream, a video stream and a data stream. The audio decoder 312 decodes the audio stream separated by the demultiplexer 311, and the audio processor 315 converts the decoded audio stream into an audible sound for the video stream or an audible sound for the data stream. The data decoder 313 decodes the data stream separated by the demultiplexer 311, and the data processor 316 converts the decoded data stream into displayable data corresponding to the display attributes selected by the user. The video decoder 314 decodes the video stream separated by the demultiplexer 311, and the video processor 317 converts the decoded video stream into a displayable image.

The display module 320 may be a liquid crystal display (LCD) module, a plasma display panel (PDP) module or a cathode ray tube (CRT) module.

The wireless signal receiver 321 receives the wireless signal transmitted from the remote controller 100, and the data demodulator 322 demodulates the wireless signal received by the wireless signal receiver 321 into the video or audio data.

The error detector 323 detects an error of the data demodulated by the data demodulator 322. The video decoder 314 decodes video data from the error detector 323, and the audio decoder 312 decodes audio data from the error detector 323.

The video processor 317 processes the decoded video data for reproduction thereof and outputs the resulting image to the display module 320, which then displays the image on the screen.

The audio processor 315 processes the decoded audio data for reproduction thereof and outputs the resulting sound through the speaker 319.

Therefore, the TV body 300 receives the wireless signal transmitted from the remote controller 100, demodulates the received wireless signal into the video or audio data and reproduces the demodulated video or audio data.

Figure 4:
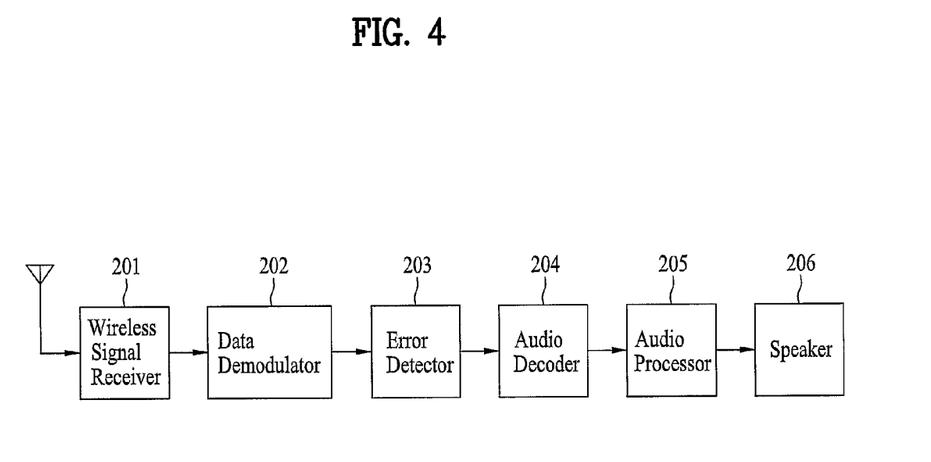
FIG. 4 is a block diagram of an audio device or headset of the digital TV remote control system according to the present invention.

FIG. 4 is a block diagram of the audio device or headset of the digital TV remote control system according to the present invention.

As shown, the audio device 400 or headset 200 of the present invention includes a wireless signal receiver 201, a data demodulator 202, an error detector 203, an audio decoder 204, an audio processor 205, and a speaker 206.

The wireless signal receiver 201 receives the wireless signal transmitted from the remote controller 100, and the data demodulator 202 demodulates the wireless signal received by the wireless signal receiver 201 into the audio data.

The error detector 203 detects an error of the data demodulated by the data demodulator 202, and the audio decoder 204 decodes audio data from the error detector 203. The audio processor 205 processes the decoded audio data for reproduction thereof and outputs the resulting sound through the speaker 206.

Preferably, the TV body 300 reproduces only the video data when the audio data is reproduced through the speaker 206 of the audio device 400 or headset 200.

Figure 5:
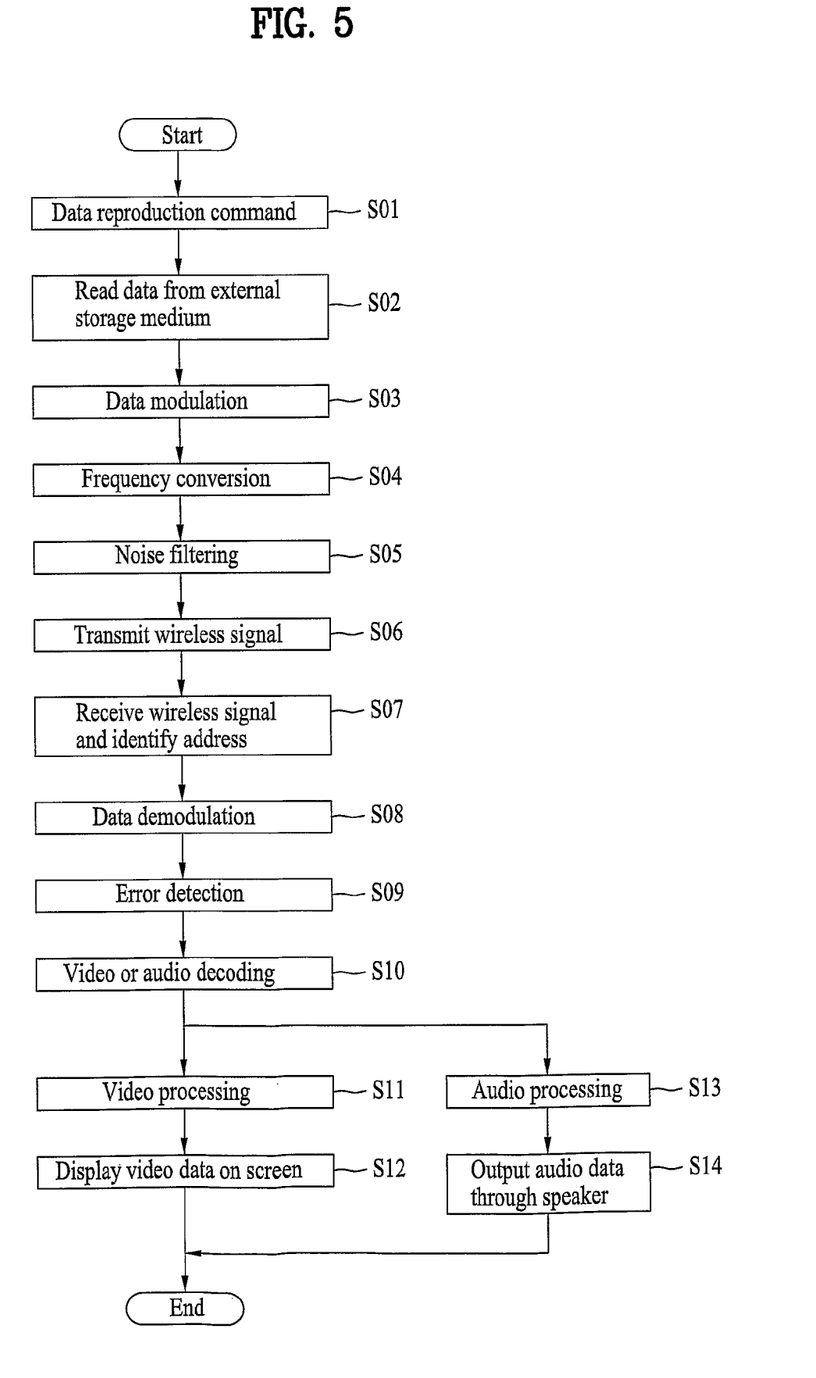
FIGS. 5 and 6 are flowcharts illustrating a method for remotely controlling the digital TV, according to the present invention.
Figure 6:
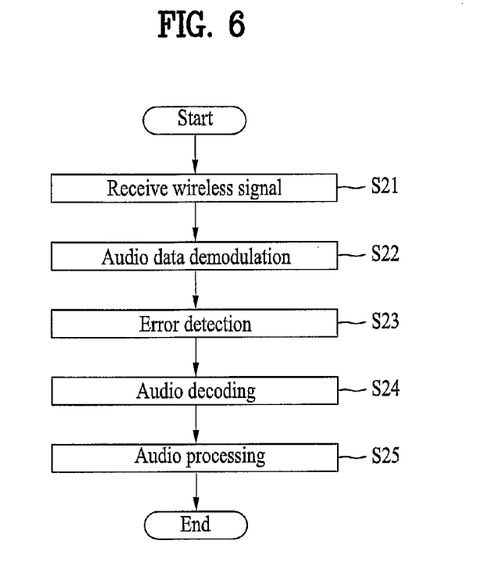

FIGS. 5 and 6 are flowcharts illustrating a method for remotely controlling the digital TV, according to the present invention.

As shown in FIG. 5, the digital TV remote control method according to the present invention comprises a remote controller transmission step (S01 to S06) of the remote controller 100 receiving video or audio data inputted from the external storage medium 110, modulating the received data into a wireless signal and transmitting the modulated wireless signal, and a TV reproduction step (S07 to S14) of the TV body 300 receiving the wireless signal transmitted from the remote controller 100, demodulating the received wireless signal into the video or audio data and reproducing the demodulated video or audio data.

The remote controller transmission step (S01 to S06) includes a data input step (S01 and S02) of reading the video or audio data from the external storage medium 110, and a data modulation step S03 of modulating the video or audio data read at the data input step (S01 and S02) into a transmittable wireless signal.

That is, the data input unit 101 reads the video or audio data from the external storage medium 110, and the data modulator 102 modulates the read video or audio data into a transmittable wireless signal.

Further, the remote controller transmission step (S01 to S06) includes a frequency conversion step S04 of down-converting a local oscillation frequency of the wireless signal modulated at the data modulation step S03 into 12 MHz or 24 MHz, and a noise filtering step S05 of filtering noise of the wireless signal frequency-down-converted at the frequency conversion step S04.

That is, the frequency converter 103 down-converts a local oscillation frequency of the wireless signal modulated by the data modulator 102 into 12 MHz or 24 MHz, and the noise filter 104 filters noise of the wireless signal frequency-down-converted by the frequency converter 103.

Further, the remote controller transmission step (S01 to S06) includes a wireless signal transmission step S06 of transmitting the wireless signal noise-filtered at the noise filtering step S05.

That is, the wireless signal transmitter 105 transmits the wireless signal noise-filtered by the noise filter 104.

The TV reproduction step (S07 to S14) includes a wireless signal reception step S07 of receiving the wireless signal transmitted from the remote controller 100, and a data demodulation step S08 of demodulating the wireless signal received at the wireless signal reception step S07 into the video or audio data.

That is, the wireless signal receiver 321 receives the wireless signal transmitted from the remote controller 100, and the data demodulator 322 demodulates the wireless signal received by the wireless signal receiver 321 into the video or audio data.

Further, the TV reproduction step (S07 to S14) includes an error detection step S09 of detecting an error of the data demodulated at the data demodulation step S08, and a video or audio decoding step S10 of decoding video or audio data outputted at the error detection step S09.

That is, the error detector 323 detects an error of the data demodulated by the data demodulator 322. The video decoder 314 decodes video data from the error detector 323, and the audio decoder 312 decodes audio data from the error detector 323.

Further, the TV reproduction step (S07 to S14) includes a video processing step S11 of processing the video data decoded at the video or audio decoding step S10, and a display step S12 of displaying the video data processed at the video processing step S11 on the screen.

That is, the video processor 317 processes the video data decoded by the video decoder 314 for reproduction thereof, and the display module 320 displays an image from the video processor 317 on the screen.

Further, the TV reproduction step (S07 to S14) includes an audio processing step S13 of processing the audio data decoded at the video or audio decoding step S10, and an audio output step S14 of outputting the audio data processed at the audio processing step S13 through the speaker.

That is, the audio processor 315 processes the audio data decoded by the audio decoder 312 for reproduction thereof, and the speaker 319 outputs a sound from the audio processor 315.

The digital TV remote control method according to the present invention further comprises an audio device or headset reproduction step S15 (not shown) of the audio device 400 or headset 200 receiving the wireless signal transmitted from the remote controller 100 and demodulating the received wireless signal to selectively reproduce only the audio data. When the audio device 400 or headset 200 reproduces the audio data, the TV body 300 reproduces only the video data.

As shown in FIG. 6, the audio device or headset reproduction step S15 includes a wireless signal reception step S21 of receiving the wireless signal transmitted from the remote controller 100.

The audio device or headset reproduction step S15 further includes a data demodulation step S22 of demodulating the wireless signal received at the wireless signal reception step S21 into the audio data, and an error detection step S23 of detecting an error of the data demodulated at the data demodulation step S22.

That is, the wireless signal receiver 201 receives the wireless signal transmitted from the remote controller 100, and the data demodulator 202 demodulates the wireless signal received by the wireless signal receiver 201 into the audio data.

The audio device or headset reproduction step S15 further includes an audio decoding step S24 of decoding audio data outputted at the error detection step S23, and an audio processing step S25 of processing the audio data decoded at the audio decoding step S24 for reproduction thereof and outputting the processed audio data through the speaker.

That is, the error detector 203 detects an error of the data demodulated by the data demodulator 202, and the audio decoder 204 decodes audio data from the error detector 203. The audio processor 205 processes the decoded audio data for reproduction thereof and outputs the processed audio data through the speaker 206.

At this time, the TV body 300 reproduces only the video data when the audio data is reproduced through the speaker 206 of the audio device 400 or headset 200.

Figure 7:
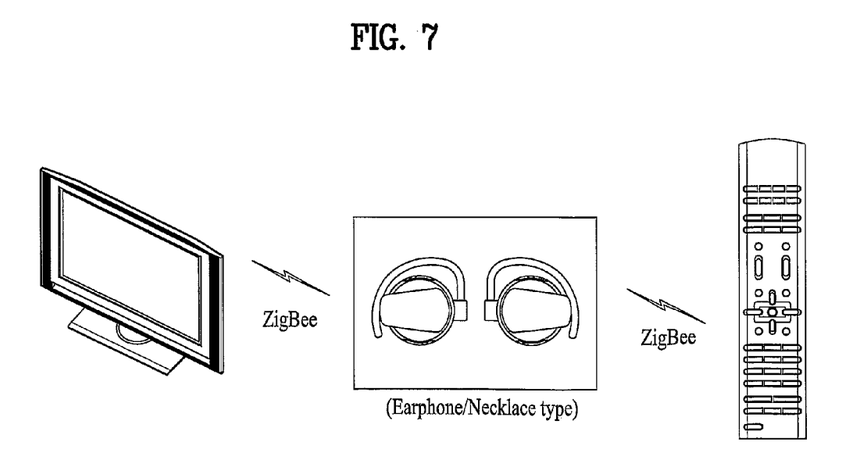
FIG. 7 is a view illustrating a practical application example of the digital TV remote control system according to the present invention.
Figure 8:
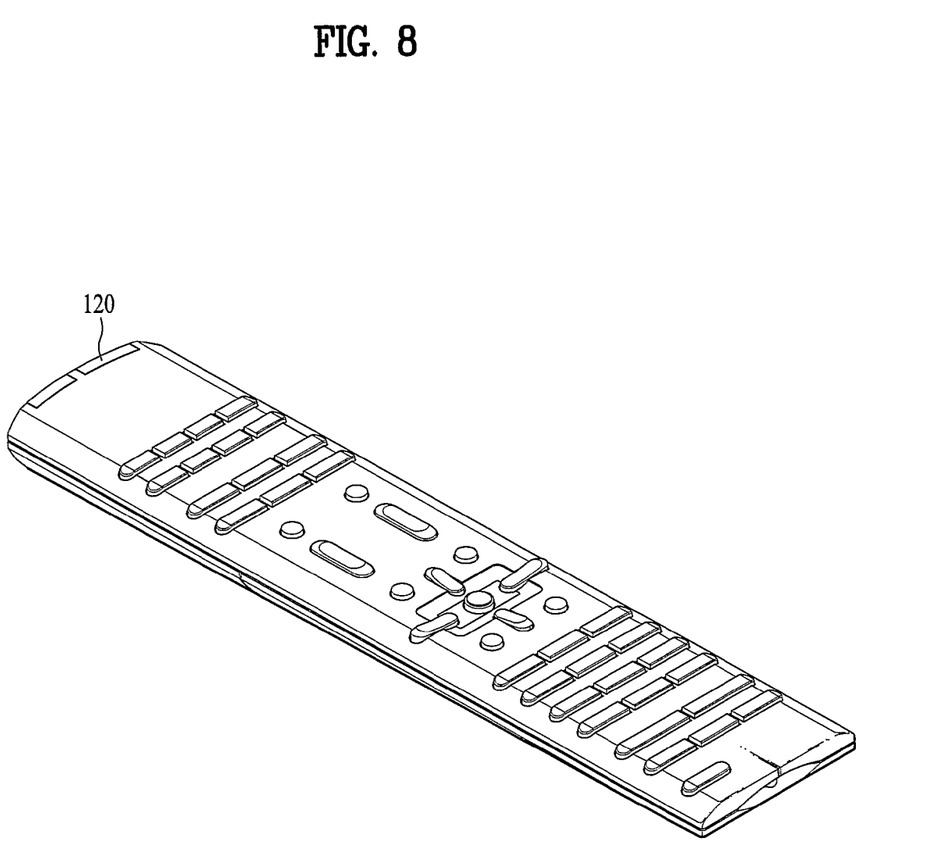
FIG. 8 is a view showing an arrangement of a memory card slot at an end portion of the remote controller according to the present invention.

FIG. 7 is a view illustrating a practical application example of the digital TV remote control system according to the present invention, and FIG. 8 is a view showing an arrangement of a memory card slot at an end portion of the remote controller according to the present invention.

As shown in FIG. 7, the remote controller 100 receives video or audio data inputted from the external storage medium 110, modulates the received data into a wireless signal and transmits the modulated wireless signal. Also, the TV body 300 receives the wireless signal transmitted from the remote controller 100, demodulates the received wireless signal into the video or audio data and reproduces the demodulated video or audio data.

The remote controller 100 has, as shown in FIG. 7, an interface 120, such as a memory card slot, formed at an end portion thereof. The external storage medium 110 is detachably mounted in the interface 120 to input the video or audio data to the remote controller 100 via the interface 120.

The external storage medium 110 may be a memory card such as a secure digital (SD) card, MultiMedia Card (MMC) or compact flash (CF) card, or a universal serial bus (USB) memory card.

Therefore, the interface 120 such as the memory card slot may also be implemented in various forms to fit the shape and format of the external storage medium 110.

Mode for the Invention

Various embodiments have been described in the best mode for carrying out the invention.

INDUSTRIAL APPLICABILITY

As apparent from the above description, according to the remote controller and the digital TV remote control system and method of the present invention, the external storage medium is mounted in the remote controller, and the remote controller receives video or audio data inputted from the external storage medium and transmits the received data to the TV body. Therefore, the user can remotely control the TV body without personally inserting the external storage medium, such as a memory card, into the TV body. As a result, the user does not need to move to a place where the TV body is located, resulting in convenience in use. In addition, the ZigBee standard communication is used, thereby enabling video or audio data of relatively large capacity to be smoothly transmitted from the remote controller to the TV body.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A system for remotely controlling a digital television (TV) using a remote controller, the system comprising:

the remote controller configured to receive video and audio data input from the external storage medium, modulate the received data into a wireless signal, down-convert a local oscillation frequency of the modulated wireless signal, and transmit a first data stream included in the down-converted wireless signal to a TV body directly while transmitting a second data stream included in the down-converted wireless signal to an audio device directly, wherein the down-converted wireless signal is used to control the TV body or the audio device selectively, and wherein the first data stream comprises the video data without the audio data, and the second data stream comprises the audio data without the video data;

a TV body configured to receive the down-converted wireless signal transmitted from the remote controller, demodulate the received wireless signal into the video data, and reproduce the demodulated video data, wherein the TV body does not demultiplex the audio data; and an audio device configured to receive the down-converted wireless signal transmitted from the remote controller, demodulate the received wireless signal into the audio data, and reproduce the demodulated audio data.

2. The system according to claim 1, wherein the wireless signal is based on any one of ZigBee, radio frequency (RF), infrared ray and Bluetooth standard technologies.

3. The system according to claim 1, wherein the external storage medium is any one of a secure digital (SD) card, a MultiMedia Card (MMC), a compact flash (CF) card and a universal serial bus (USB) memory card.

4. The system according to claim 1, wherein the TV body reproduces only the video data when the audio device or headset reproduces the audio data.

5. The system according to claim 1, wherein each of the audio device and headset comprises:
  a wireless signal receiver configured to receive the wireless signal transmitted from the remote controller;
  a data demodulator configured to demodulate the wireless signal received by the wireless signal receiver into the audio data;
  an error detector configured to detect an error of the data demodulated by the data demodulator;
  an audio decoder configured to decode audio data from the error detector;
  an audio processor configured to process the decoded audio data for reproduction thereof; and
  a speaker configured to output the audio data processed by the audio processor.

6. The system according to claim 1, wherein the remote controller has an interface formed at an end portion thereof, the external storage medium being detachably mounted in the interface to input the video or audio data to the remote controller via the interface.

7. The system according to claim 1, wherein the video data is still image data or moving image data.

8. The system according to claim 1, wherein the audio data is MP3 file data.

9. A remote controller comprising:
  a data input unit configured to receive video and audio data input from an external storage medium;
  a data modulator configured to modulate the video and audio data received by the data input unit into a transmittable wireless signal;
  a frequency converter configured to down-convert a local oscillation frequency of the wireless signal modulated by the data modulator, wherein the down-converted wireless signal is used to control a TV body or an audio device selectively; and
  a wireless signal transmitter configured to transmit a first data stream included in the down-converted wireless signal to the TV body directly while transmitting a second data stream included in the down-converted wireless signal to the audio device directly, wherein the first data stream comprises the video data without the audio data, and the second data stream comprises the audio data without the video data, and
  wherein the TV body does not demultiplex the audio data.

10. The remote controller according to claim 9, wherein the frequency converter down-converts the location oscillation frequency into 12 MHz or 24 MHz.

11. The remote controller according to claim 9, further comprising an indicator configured to indicate that the wireless signal is transmitted.

12. The remote controller according to claim 11, wherein the indicator is a light emitting diode (LED).

* * * * *